Patented Dec. 13, 1932

1,890,723

UNITED STATES PATENT OFFICE

MAX DESENISS AND ANDREAS NIELSEN, OF HAMBURG, GERMANY, ASSIGNORS TO THE FIRM NEW-YORK HAMBURGER GUMMIWAAREN COMPAGNIE, OF HAMBURG, GERMANY, A COMPANY INCORPORATED IN GERMANY

COATING MATERIAL

No Drawing. Application filed April 14, 1931, Serial No. 530,126, and in Germany April 8, 1929.

This invention relates to an improved coating having chemically resistant and electrically insulating properties. Substances such as tar, tar-pitch, asphalt and other bitumina have long been used for the production of anticorrosive protective coatings for, for instance, metal, cement and concrete, but particularly for metal surfaces which are to be insulated against the effects of stray currents, for instance, gas and water pipes. These coatings have not proved satisfactory in as much as said coatings, when of the requisite thickness to make a mechanical covering and to exclude the air or corrosive liquids, exhibit a tendency to flow, particularly at a somewhat elevated temperature, so that said coatings had frequently to be held in the position at which they were to be effective by being bound with jute, wool-felt and the like. Moreover the electrical insulating properties of such coatings, particularly when they have a high content of free carbon, are not very good.

According to the present invention such coating materials may be substantially improved if they are employed in conjunction with chlorinated rubber solutions. On evaporation of the solvent from chlorinated rubber solutions the chlorinated rubber is left as a very hard brilliant layer which is chemically inert towards all reagents which need be considered and also constitutes an excellent electrical insulating material. Any desired quantity of a bituminous substance such as tar, tar-pitch, asphalt or the like may be dissolved with chlorinated rubber in an appropriate solvent, e. g. solvent benzene. After evaporation of the solvent these mixtures yield coatings which are characterized on the one hand by ample hardness and chemical inertness and on the other hand by particularly high electrical insulating powers.

Naturally filling agents, particularly inorganic substances such as very finely ground asbestos, kieselguhr or the like may also be added to the coating materials consisting of a bituminous substance and chlorinated rubber. By this means the coating is firstly made much cheaper and secondly a particularly secure adherence to metal surfaces and pipes is obtained without the chemical and electrical properties being materially impaired.

Such coatings are of very especial importance for gas and water pipes laid underground and exposed to the action of rust and, particularly, to electric currents. They can thus be used with advantage in any case where rust-protection or mechanical and electrical insulation are required.

The following proportions of the materials used are found to be satisfactory:

*Example 1*

Chlorinated rubber _____ 100
Distillated tar _____ 100
Benzene _____ 200

*Example 2*

Chlorinated rubber _____ 100
Distillated tar _____ 150
Benzene _____ 200

*Example 3*

Chlorinated rubber _____ 100
Bitumina _____ 50
Benzene _____ 200

*Example 4*

Chlorinated rubber _____ 100
Tar-pitch _____ 100
Powdered asbestos _____ 150
Benzene _____ 200

Having now particularly described and ascertained the nature of our said invention, and in what manner the same is to be performed, we declare that what we claim is:

1. An insulating coating material comprising a mixture of chlorinated rubber and a bituminous substance selected from the group consisting of tar, tar-pitch, and asphalt.

2. An insulating coating material comprising a mixture of chlorinated rubber and tar.

3. An insulating coating material comprising a mixture of chlorinated rubber and asphalt.

4. An insulating coating material comprising a mixture of chlorinated rubber and tar-pitch.

MAX DESENISS.
ANDREAS NIELSEN.